US006571010B1

United States Patent
Inoue

(10) Patent No.: US 6,571,010 B1
(45) Date of Patent: May 27, 2003

(54) COLOR CONVERSION APPARATUS THAT INTERPOLATES OUTPUT COLOR VALUES OBTAINED FROM A COLOR CONVERSION TABLE IN ACCORDANCE WITH WEIGHTED INPUT COLOR VALUES

(75) Inventor: Makoto Inoue, Ohtsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/444,294

(22) Filed: Nov. 22, 1999

(30) Foreign Application Priority Data

Nov. 27, 1998 (JP) .......................................... 10-337326

(51) Int. Cl.$^7$ .............................. G06K 9/00; G06K 9/32; G06K 9/34
(52) U.S. Cl. ........................ 382/162; 382/300; 382/164; 382/167; 382/173; 382/293; 382/298; 382/299
(58) Field of Search ................................. 382/162, 164, 382/165, 173, 167, 300, 293, 298, 299; 358/515, 518, 523, 525, 1.1, 1.9, 451, 530; 345/600, 601, 602, 603, 604, 606, 608, 653, 664

(56) References Cited

U.S. PATENT DOCUMENTS

| 4,511,989 | A | | 4/1985 | Sakamoto | |
| 5,311,332 | A | * | 5/1994 | Imao et al. ................. | 358/518 |
| 5,428,465 | A | | 6/1995 | Kanamori et al. | |
| 5,504,821 | A | * | 4/1996 | Kanamori et al. ........... | 382/167 |
| 5,666,437 | A | | 9/1997 | Vondran, Jr. | |
| 6,137,494 | A | * | 10/2000 | Nin ............................. | 345/431 |
| 6,215,561 | B1 | * | 4/2001 | Kakutani ..................... | 358/1.9 |

FOREIGN PATENT DOCUMENTS

| JP | 5816180 | 3/1983 |
| JP | 814843 | 2/1996 |
| JP | 898046 | 4/1996 |
| JP | 969961 | 3/1997 |

* cited by examiner

Primary Examiner—Phuoc Tran
Assistant Examiner—Amir Alavi
(74) Attorney, Agent, or Firm—Stevens, Davis, Miller & Mosher, LLP

(57) ABSTRACT

A color conversion method and a color conversion apparatus are provided in which in performing a color conversion, an efficient color conversion table memory is efficiently used and a given color conversion is performed over the entire color space by use of the output values at a plurality of vertices of a unit interpolation solid with continuity being ensured to thereby eliminate the necessity for a color conversion table other than the color conversion table for the input color space. A signal line PNTSL is provided in a solid area determiner and a solid interpolation calculator, and the output of a color conversion table memory and the calculation used for an interpolation of a given solid and an interpolation of a divisional solid obtained by dividing the given solid such as a triangular prism interpolation and a tetrahedron interpolation are switched to those for any one of the interpolations.

4 Claims, 6 Drawing Sheets

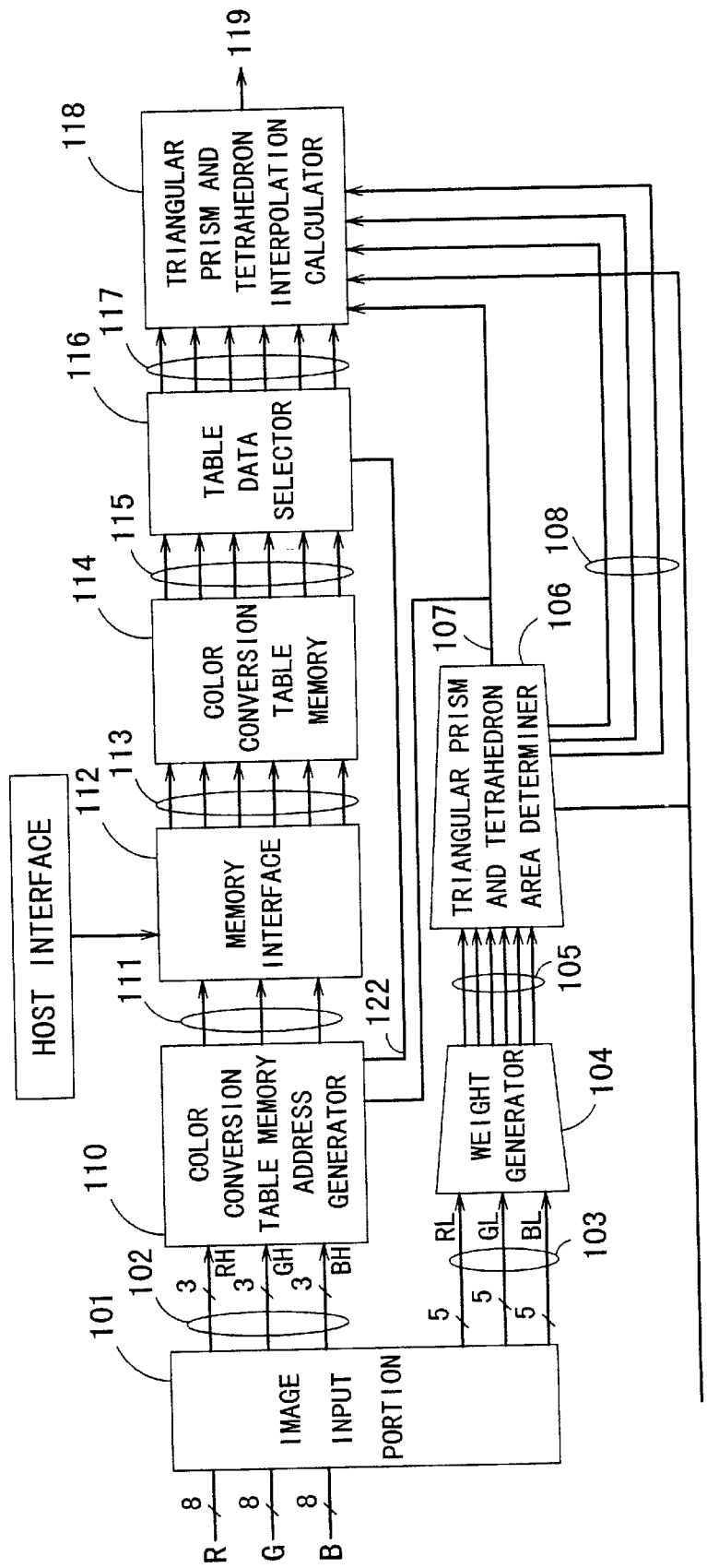

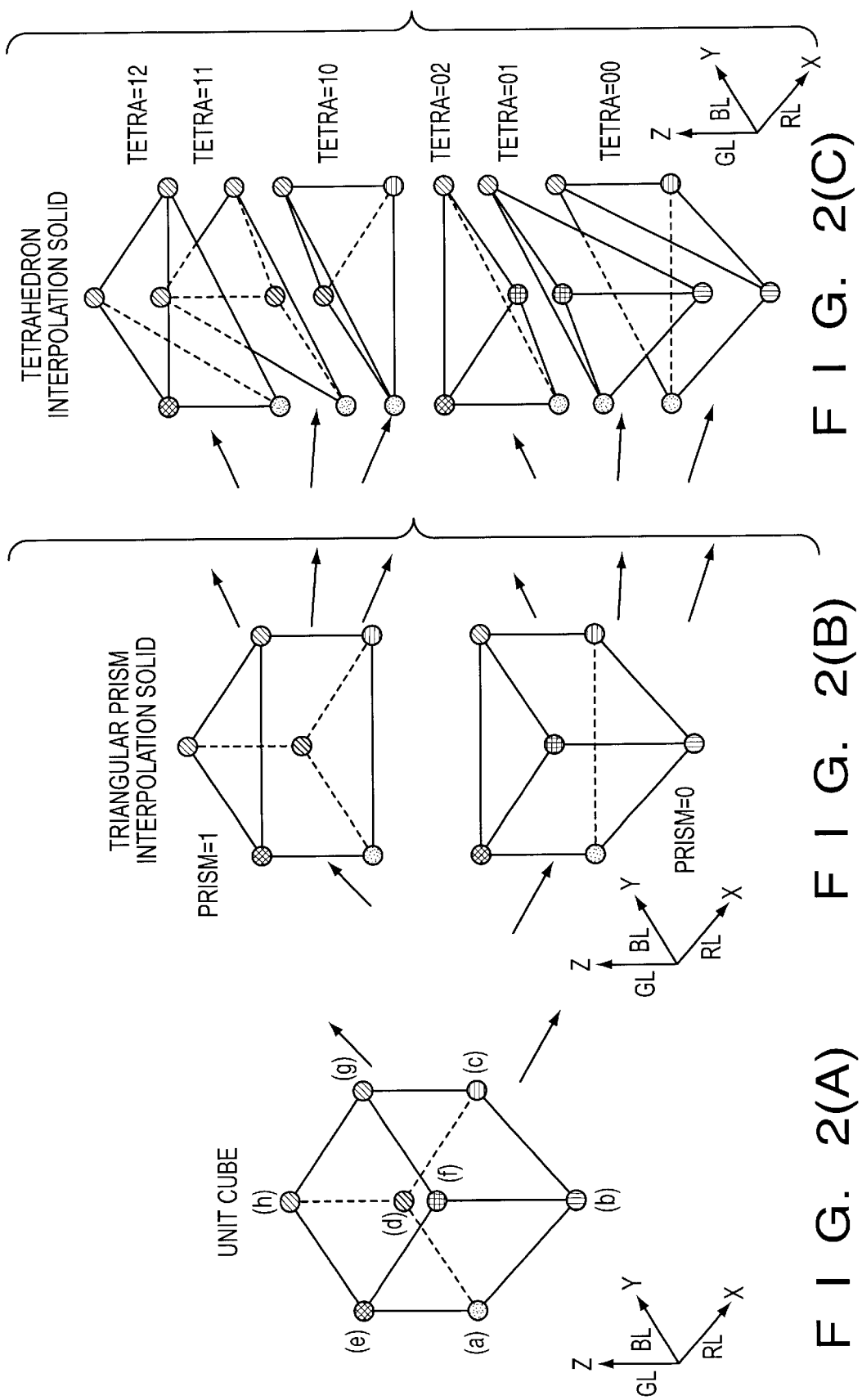

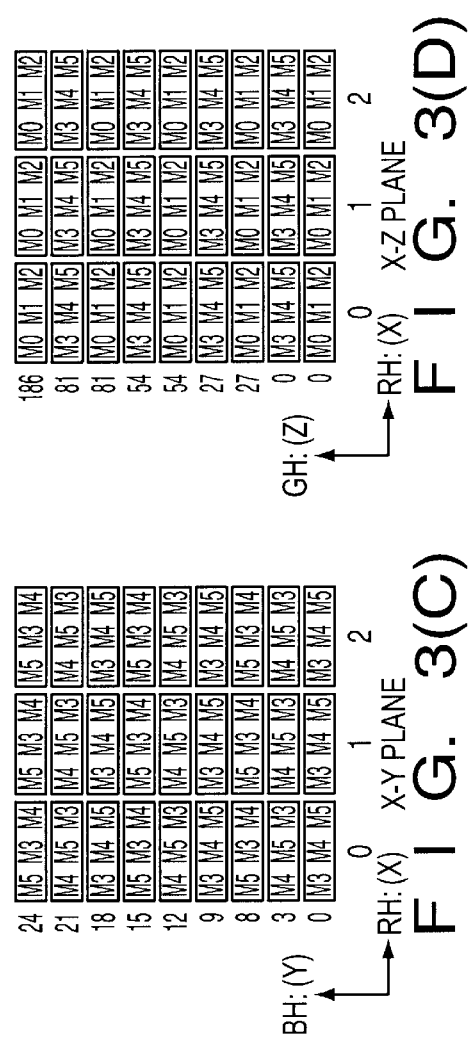
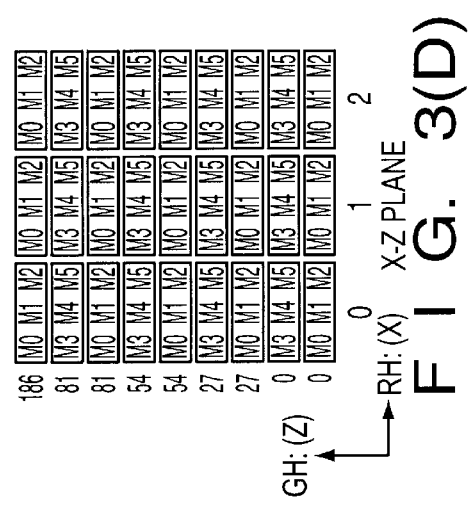
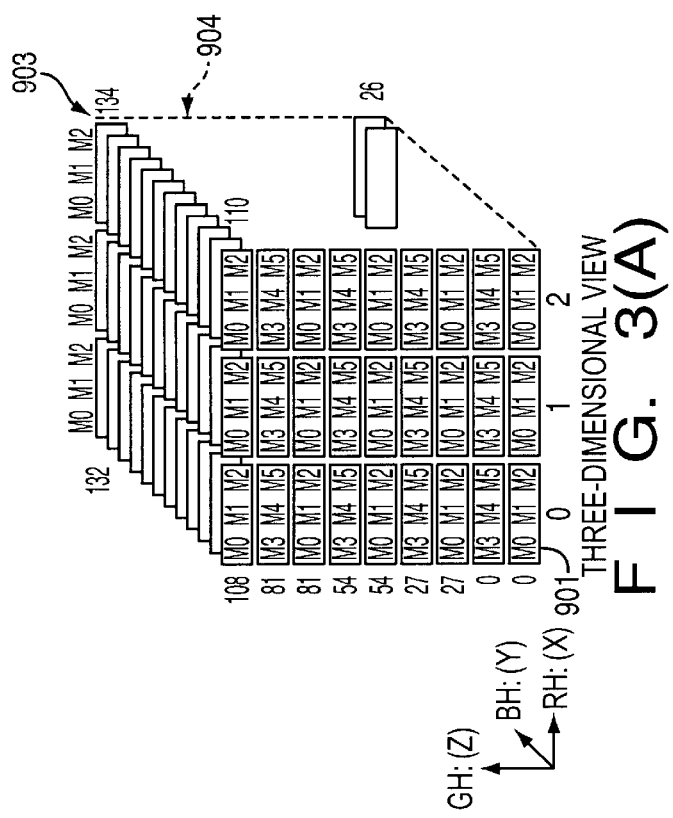
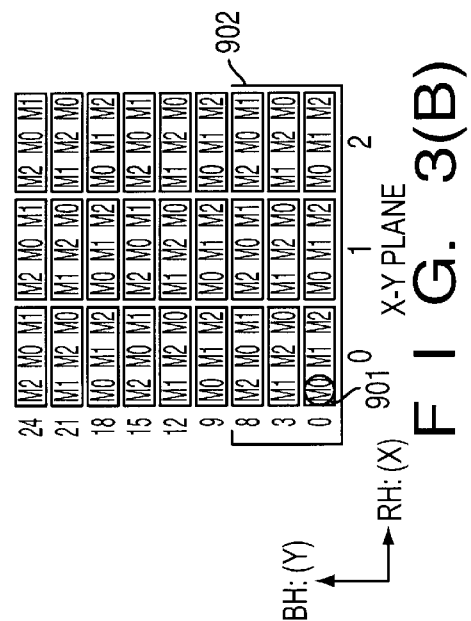

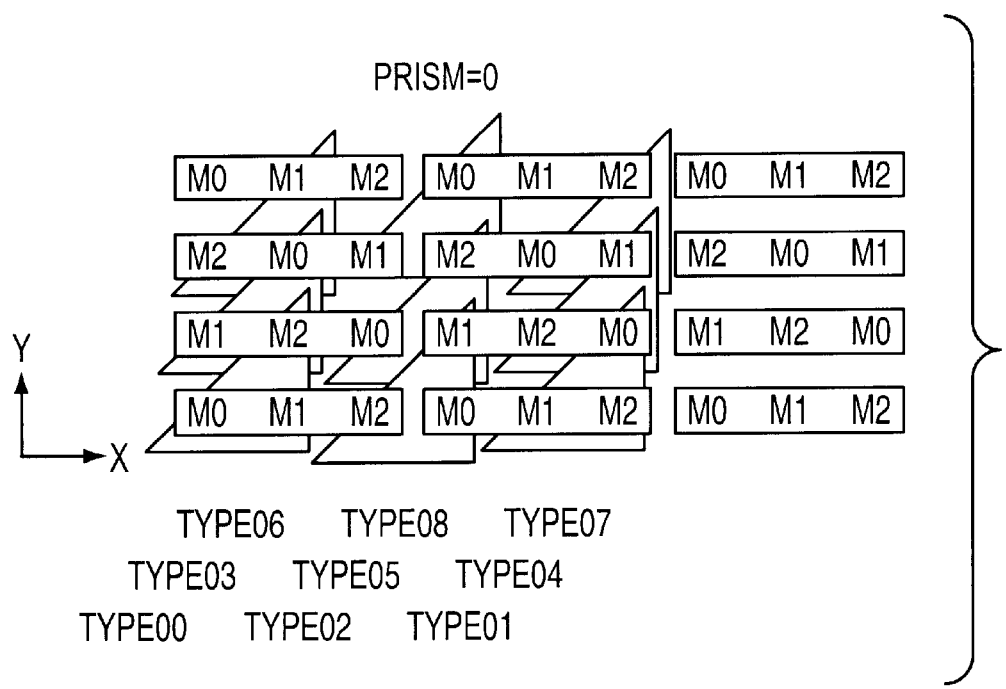
F I G. 4(A)
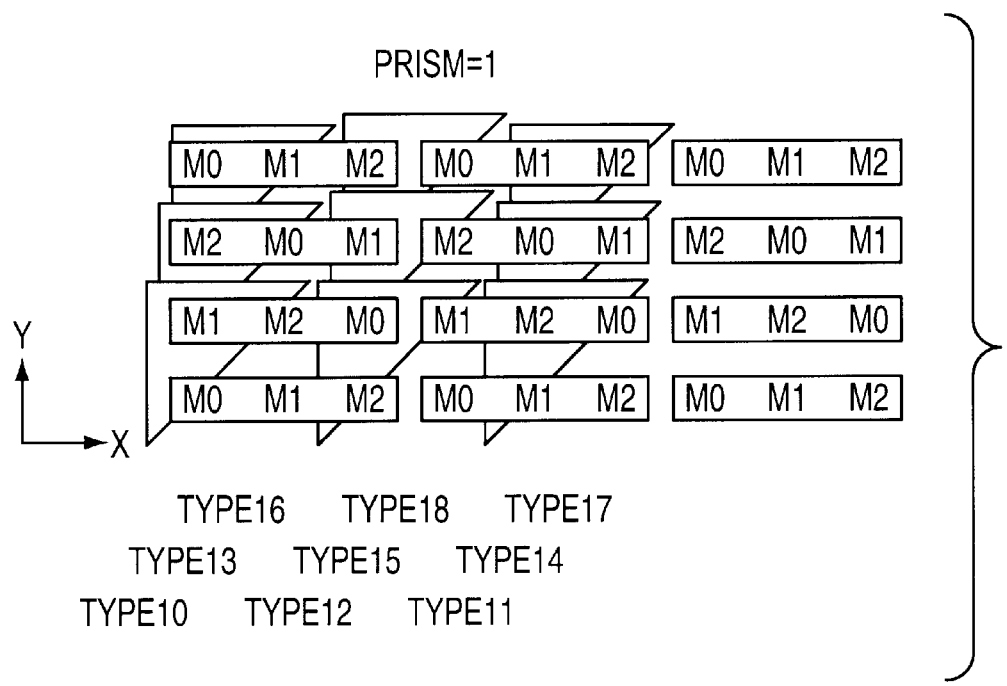
F I G. 4(B)

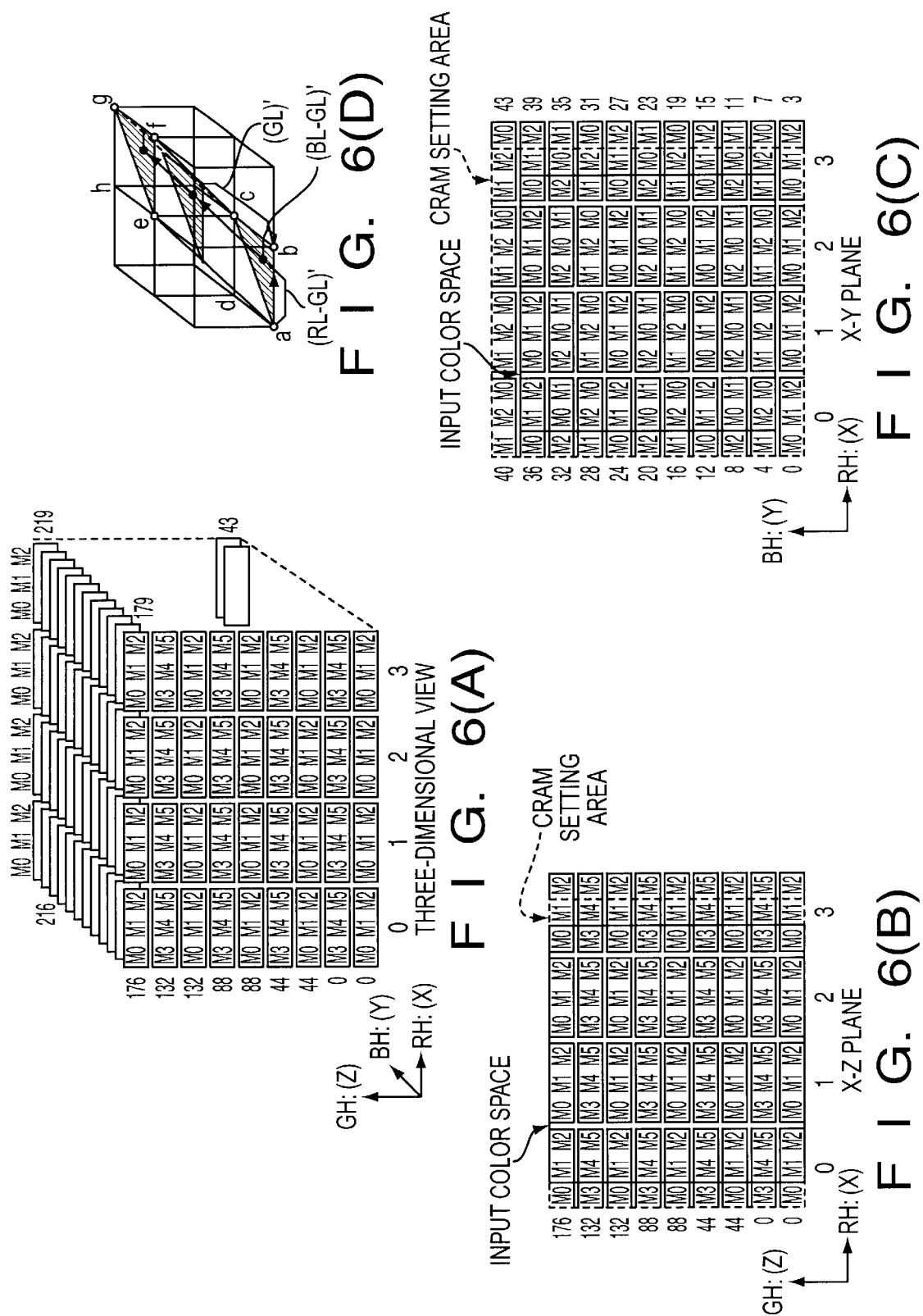

COLOR CONVERSION APPARATUS THAT INTERPOLATES OUTPUT COLOR VALUES OBTAINED FROM A COLOR CONVERSION TABLE IN ACCORDANCE WITH WEIGHTED INPUT COLOR VALUES

BACKGROUND OF THE INVENTION

1. Field of the Invention

The present invention relates to a color conversion method and a color conversion apparatus used for performing a given color coordinate conversion or color conversion within real time in response to input of color image signals or color video signals, such as for color scanners, color cameras, color hardcopy apparatuses, color displays, color television cameras, color recognizer, video editors and color printers that require high-speed color masking and correction.

2. Description of the Related Art

Conventionally, table look-up methods using three-dimensional interpolation have been proposed as methods for performing various kinds of complicated color signal conversions with facility at high speed. In these methods, as the three-dimensional interpolation, a color space is divided into a plurality of unit interpolation solid groups, a unit interpolation solid including an input color is selected, and using the output values at a plurality of vertices of the unit interpolation unit, a given color conversion is interpolated over the entire color space with continuity being ensured. At present, the following interpolations are known, in all of which the color space is divided into a plurality of unit solid groups: an eight-point interpolation in which the vertices of a solid are used as they are; a six-point interpolation in which the solid groups are divided into two triangular prism groups; a four-point interpolation in which a solid is divided into five or six tetrahedron groups (Japanese Published Patent Application No. Sho 58-16180); and a five-point interpolation in which a solid is divided into square pyramids.

Of these, interpolations proposed as color conversion apparatuses include a triangular prism interpolation method in which a YCrCb lightness and color difference space is divided into triangular prisms with the principal axis being set in the Y direction and the other two axes being set within the color difference plane to perform interpolation. This method can effectively be used for input color spaces of lightness and color difference spaces (Japanese Published Patent Application No. Hei 8-14843).

Another proposed interpolation is an oblique triangular prism interpolation method. With this method, for color space inputs of three primary colors, the generation of "ripples" in the MIN calculation frequently used in color conversions can completely be avoided in all the directions in the input color space irrespective of the achromatic direction. Therefore, a color conversion apparatus that switches between the triangular prism interpolation method and the oblique triangular prism interpolation method with facility has been proposed (Japanese Laid-open Patent Application No. Hei 8-98046) in order to compensate for defects of the triangular prism interpolation method for the inputs of the three primary colors. This will be referred to as a first prior art.

The triangular prism interpolation method and the oblique triangular prism interpolation method are very high in general versatility for the following reason: Since the number of vertices is the same in these interpolation methods, the color conversion table memories can have the same structure and can easily be switched with a common control line, so that both lightness and color difference signal inputs and three primary color inputs can effectively be handled, enabling the provision of a color conversion being effective for all the color space inputs. However, to perform the oblique triangular prism interpolation, it is necessary to provide a table memory other than the table memory for the input color space, which results in an increased number of memories.

To solve this problem, a method has been proposed in which a circuit that performs extrapolation by use of the data at the endmost point for the inputs other than the input color space is added (Japanese Laid-open Patent Application No. Hei 9-69961). This will be referred to as a second prior art.

The first prior art in which color conversion is efficiently performed on the input color signals of lightness and chromaticity, or the three primary colors or tristimulus values faces the following problem: In the first prior art, it is necessary to provide a color conversion table for the output values at lattice points outside the input color space, which results in an increased memory scale. For example, when it is intended to divide the input color space into unit rectangular solids of oblique triangular prisms as shown in FIG. 6, since a rectangular solid of an oblique triangular prism cannot be formed on the outermost surface in the X-Y direction, lattice points outside the input color space are provided and an interpolation calculation of the outermost surface of the input color space is performed. This results in an increased number of lattice points. Reference numerals M0 to M5 represent color conversion table memories, which are sectioned as shown in FIG. 6(a). FIG. 6(b) shows the X-Z plane. FIG. 6(c) shows the X-Y plane. FIG. 6(d) shows unit interpolation rectangular solids of oblique triangular prisms with points a, b, c, d, e, f and g as the lattice points. Since the unit interpolation rectangular solids include three of the above-mentioned unit solids, a CRAM setting area shown by the dotted lines is necessary for the input color space shown by the black solid lines shown in FIGS. 6(b) and 6(c).

The second prior art faces the following problem: To solve the problem of the first prior art, the second prior art is intended for avoiding the increase in the number of color conversion table memories by extrapolating the output values at the lattice points outside the input color space from the output values at the lattice points within the input color space. Although the increase in the number of color conversion memories can surely be avoided, the ensuring of continuity, which should be an essential purpose, cannot be achieved on the outermost surface of the input color space in interpolating a given color conversion over the entire color space by use of the output values at a plurality of vertices of the unit interpolation solid with continuity being ensured. This is because it is difficult to consider that effective color conversion means can always be established for a given color conversion since hardware is used to handle re-use of outermost surface data.

An object of the present invention is to provide a color conversion method and a color conversion apparatus in which for input color signals of, for example, lightness and chromaticity, or the three primary colors or the tristimulus values, an efficient color conversion table memory is used for a high-speed and high-precision color conversion and by use of the output values at a plurality of vertices of a unit interpolation solid, a given color conversion is interpolated over the entire color space with continuity being ensured to thereby eliminate the necessity for a color conversion table other than the color conversion table for the input color space.

SUMMARY OF THE INVENTION

A color conversion method of the present invention is a color conversion method in which an input color space is divided into unit solids, lattice point data constituting the unit solids are stored in a three-dimensional color conversion table memory, and an interpolation calculation is performed by use of the color conversion table memory for performing a color conversion of a color image signal expressed by various color signals, wherein lattice point data used for a first interpolation method using a smaller amount of lattice point data for the color conversion is a subset of lattice point data used for a second interpolation method using a larger amount of lattice point data for the color conversion, and the first or the second interpolation method is selected to perform the color conversion.

According to the color conversion method of the present invention, for input color signals of, for example, lightness and chromaticity, or the three primary colors or the tristimulus values, an efficient color conversion table memory is used for a high-speed and high-precision color conversion and by use of the output values at a plurality of vertices of a unit interpolation solid, a given color conversion is interpolated over the entire color space with continuity being ensured to thereby eliminate the necessity for a color conversion table other than the color conversion table for the input color space. Therefore, compared to the conventional methods, excellent cost performance is realized.

Moreover, a color conversion apparatus of the prevent invention comprises: an image input portion for separating a color image signal expressed by various color signals into a higher-order bit part and a lower-order bit part; a weight generator for generating, by use of the lower-order bit part, interpolation weight coefficients corresponding to a given solid and a divisional solid obtained by dividing the given solid; a determiner for choosing between the given solid and the divisional solid based on magnitudes of the interpolation weight coefficients; an address generator for generating a color conversion table memory address to be accessed, based on the higher-order bit part and an output of the determiner; a color conversion table memory in which output values at lattice points of an input color signal are stored and divided into a predetermined number of groups; a selector for, from the lattice point outputs stored in the color conversion table memory, selecting a plurality of lattice point outputs when an interpolation method of the given solid is used, and selecting an applicable lattice point output from a plurality of lattice points when an interpolation method of the divisional solid is used; and an interpolation calculator for interpolating the output value read out from the color conversion table memory by use of the interpolation weight coefficient, wherein the following switchings are performed with a common control signal: whether the selector outputs vertex data of the given solid or vertex data of the divisional solid; whether the weight generator outputs the interpolation weight coefficient corresponding to the given solid or the interpolation weight coefficient corresponding to the divisional solid; and whether the interpolation calculator performs an interpolation of the given solid or an interpolation of the divisional solid.

Moreover, a color conversion apparatus of the present invention comprises: an image input portion for separating a color image signal expressed by various color signals into a higher-order bit part and a lower-order bit part; a weight generator for generating interpolation weight coefficients corresponding to a triangular prism and a tetrahedron by use of the lower-order bit part; a determiner for choosing between the triangular prism and the tetrahedron based on magnitudes of the interpolation weight coefficients; an address generator for generating a color conversion table memory address to be accessed, based on the higher-order bit part and an output of the determiner; a color conversion table memory in which output values at lattice points of an input color signal are stored and divided into six groups; a selector for, from the lattice point outputs stored in the color conversion table memory, selecting six points when a triangular prism interpolation method is used and selecting four points of the six points when a tetrahedron interpolation method is used; and an interpolation calculator for interpolating the output value read out from the color conversion table memory by use of the interpolation weight coefficient, wherein the following switchings are made with a common control signal: whether the selector outputs vertex data of the tetrahedron or vertex data of the triangular prism; whether the weight generator outputs the interpolation weight coefficient corresponding to the tetrahedron or the interpolation weight coefficient corresponding to the triangular prism; and whether the interpolation calculator performs a triangular prism interpolation or a tetrahedron interpolation.

BRIEF DESCRIPTION OF THE DRAWINGS

FIG. 1 is a block connection diagram showing the structure of a color conversion apparatus according to an embodiment of the present invention;

FIGS. 2 (A) to 2(C) show division of a unit solid in the embodiment;

FIGS. 3(A) to 3(D) show input color space correspondence of a color conversion table memory in the embodiment, FIG. 3(A) being a solid view, FIGS. 3(B) and 3(C) being X-Y plane views thereof, and FIG. 3(D) being an X-Z plane view thereof;

FIGS. 4(A) and 4(B) show color conversion table memory assignment in the embodiment;

FIGS. 6(*a*) to 6(*d*) are views of color space division by the oblique triangular prism interpolation method, FIG. 6(*a*) being a solid view, FIG. 6(*b*) being an X-Z plane view thereof, FIG. 6(*c*) being an X-Y plane view thereof, and FIG. 6(*d*) being an explanatory view of an oblique triangular prism.

DESCRIPTION OF THE PREFERRED EMBODIMENT

Figure 5:
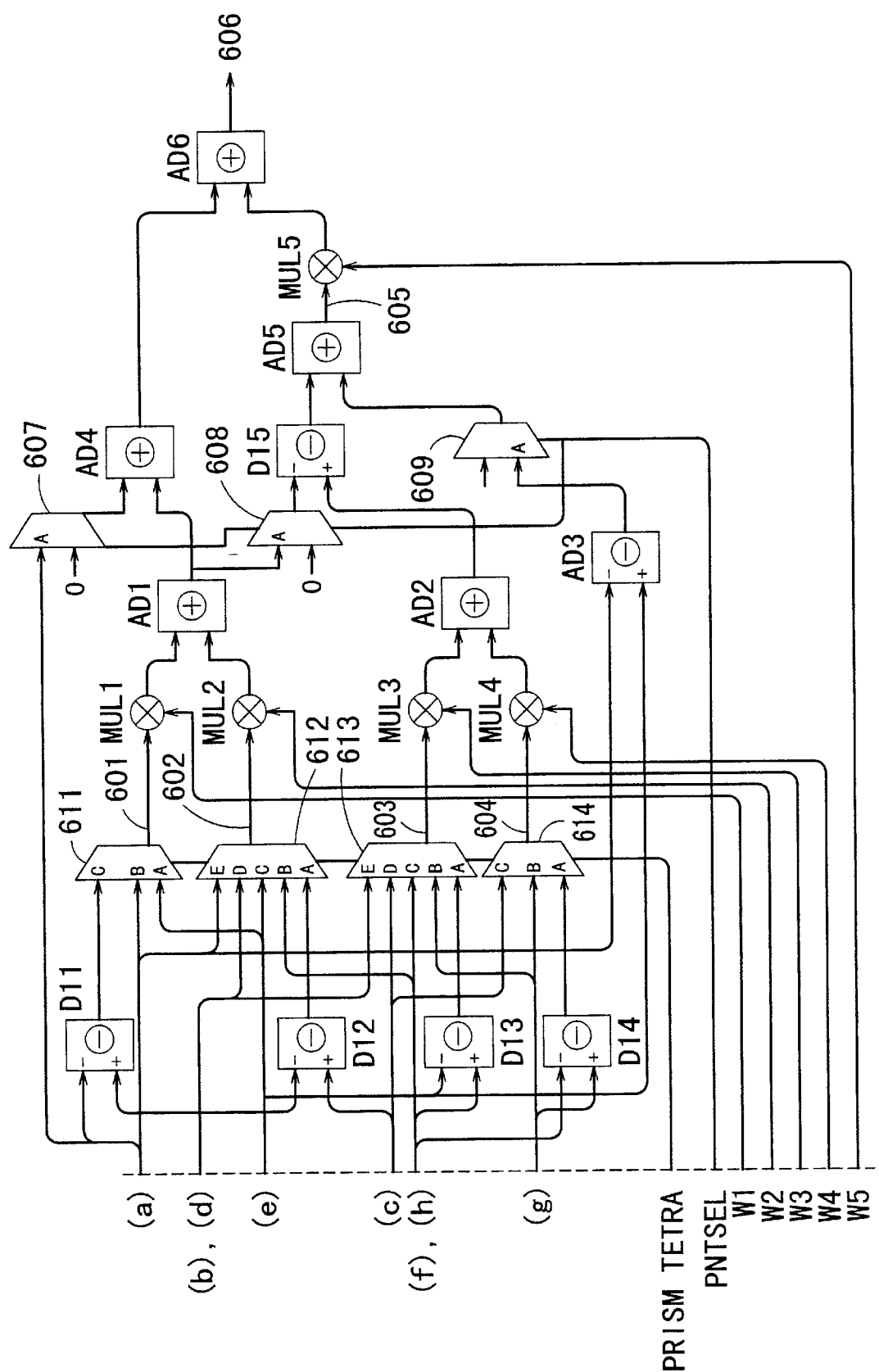
FIG. 5 is a block diagram of a triangular prism and tetrahedron interpolation calculator in the embodiment.

Hereinafter, an embodiment of the present invention will be described with reference to FIGS. 1 to 5. FIG. 1 is a block diagram showing a color conversion apparatus according to the embodiment of the present invention. Reference numeral 101 represents an image input portion for separating image input signals RGB into higher-order bits and lower-order bits. In this embodiments, the image input signals RGB are separated into three higher-order bits and five lower-order bits. Reference numeral 102 represents the color signal of the three higher-order bits of the eight bits of each input color signal. Reference numeral 103 represents the color signal of the five lower-order bits of each input color signal. Reference numeral 104 represents a weight generator for generating weights from the lower-order bits. Reference numeral 105 represents the output of the weight generator 104. Reference numeral 106 represents a triangular prism and tetrahedron area determiner for determining, based on the output 105, in which area of the triangular prisms and the tetrahedrons obtained by dividing the applicable rectangular solid the input color signal is present. Reference numeral 107 represents the output from the triangular prism and tetrahedron area determiner 106. The output 107 comprises a triangular prism determination signal PRISM and a tetrahedron determination signal TETRA. Reference numeral 108 represents a selected weight coefficient. Reference numeral 110 represents a color conversion table memory address generator for generating applicable addresses of a color conversion table memory 114 from the color signal 102 of the higher-order bit part. Reference numeral 111 represents the address output of the color conversion table memory address generator 110. Reference numeral 122 represents a selection signal STYPE for recognizing the origin of the applicable triangular prism and making a selection from the outputs of the color conversion table memory 114 to deliver table data to a triangle prism and tetrahedron interpolation calculator 118. Reference numeral 121 represents a host interface for writing table data into the color conversion table memory 114. Reference numeral 120 represents the output of the host interface 121. Reference numeral 112 represents a memory interface for switching between the access of the output 111 of the address generator 110 and the access of the output 120 of the host interface 121. Reference numeral 113 represents the output thereof. Reference numeral 114 represents the color conversion table memory. Reference numeral 115 represents the output thereof. Reference numeral 130 represents a switching signal PNTSEL being transmitted to switch between the triangular prism interpolation and the tetrahedron interpolation with a common control line. Reference numeral 116 represents a table data selector for selecting the data of a plurality of lattice points used for an interpolation of a solid, of a plurality of lattice points used when an interpolation of a divisional solid is used, or of the lattice point at the vertex of the applicable triangular prism or tetrahedron. Reference numeral 117 represents the output of the table data selector 116. Reference numeral 118 represents an interpolation circuit, that is, the triangular prism and tetrahedron interpolation calculator for performing linear interpolation. Reference numeral 119 represents the output signal comprising a color-converted color signal.

The operation of the color conversion apparatus structured as described above will be described. At the image input portion 101, the higher-order bits (RH, GH, BH) and the lower-order bits (RL, GL, BL) are generated. In this embodiment, three higher-order bits and five lower-order bits for each of R, G and B are generated. The weights for the triangular prism interpolation generated from the lower-order bits by the weight generator 104 are shown in TABLE 1.

TABLE 1

| Weight coefficient direction | Weight |
| --- | --- |
| X direction | RL |
| Y direction | BL |
| Z direction | GL |

As the weights for the tetrahedron interpolation, the values of the expression 1 shown below are generated in addition to the values shown in TABLE 1.

$$R1-B1, GL-RL, GL-BL \qquad \text{(Expression 1)}$$

At the triangular prism and tetrahedron area determiner 106, the applicable one of the triangular prisms and the tetrahedrons is specified based on the sign bits of the expression 1.

The division of the triangular prisms and the tetrahedrons is shown in FIGS. 2(A) to 2(C). The unit solid shown in FIG. 2(A) is divided into two triangular prisms based on the magnitudes of RL and BL as shown in FIG. 2(B). When RL is lower than BL, that is, the sign bit of RL-BL is negative, PRISM=1. When the sign bit of RL-BL is positive, PRISM=0. The triangular prisms of PRISM=0 and PRISM=1 are each divided into three tetrahedrons based on the magnitudes of GL and BL and the magnitudes of GL and RL as shown in FIG. 2(C). The correspondence between the sign bits of GL-BL and GL-RL and the applicable solids is as shown in TABLE 2.

TABLE 2

| PRISM | 0 | | | 1 | | |
| --- | --- | --- | --- | --- | --- | --- |
| Sign (RL-BL) | + | + | + | − | − | − |
| Sign (GL-RL) | + | + | − | + | − | − |
| Sign (GL-BL) | + | − | − | + | + | − |
| TETRA | 02 | 01 | 00 | 12 | 11 | 10 |

The output 107 comprises the triangular prism determination signal PRISM and the tetrahedron determination signal TETRA. The signal PRISM acts on the address generator 110 and the table data selector 116. The signal TETRA acts on the table data selector 116. Weight signals for the triangular prisms and the tetrahedrons are generated as the selected weight coefficient 108.

Next, the structure of the color conversion table memory 114 in this embodiment will be described. The output values at 729 (=9×9×9) lattice points obtained by dividing each of the R, G and B axes into eight equal parts are stored into the color conversion table memory 114. For one interpolation calculation, six lattice points are used when the triangular prism interpolation is used, and four of the six lattice points are used when the tetrahedron interpolation is used. In order to increase the calculation speed of the color conversion apparatus, it is necessary to simultaneously read out the data of the six lattice points from the memory. To realize this, the simultaneously read out output values at the six lattice points are previously stored, for example, in six separate color conversion table memories (M0 to M5) being divided into a predetermined number of groups.

Thus, in the color conversion table memory 114, it is necessary to provide six memories and to dispose the simultaneously accessed lattice points in different memories. Therefore, in which of M0 to M5 of the color conversion table memory 114 the data of the 729 lattice points are stored will be described with reference to FIGS. 3(A) to 3(D).

FIG. 3(A) shows the RGB space of the color conversion table memory 114 comprising the 729 lattice points. The spatial axis is (X, Y, Z)=(RH, BH, GH). Consideration is separately given to the three lattice points on the top surface and the three lattice points on the bottom surface of the six lattice points constituting the triangular prism. That is, the planes of GH=0, 2, 4, 6 and 8 (even-numbered planes) are assigned to the color conversion table memories M0 to M2, and the planes of GH=1, 3, 5, and 7 (odd-numbered planes) are assigned to the color conversion table memories M3 to M5.

FIG. 3(B), which is an X-Y plane view of FIG. 3(A), shows the manner of assignment to the memories on the planes of GH=0, 2, 4, 6 and 8 where GH is an odd number. First, the origin position (on the G axis) 901 is stored in M0, and the memory into which the lattice point data is stored is changed to M1, M2, M0, M1, M2, M0, M1 and M2 every time the storage position is moved in the direction of the R axis. When the memory space becomes full in the direction of the R axis, the storage position is returned to RH=0 and is moved by one row in the direction of the B axis. Starting at M1 on the B axis, the storage position is again moved to M2, M0, M1, M2, M0, M1, M2 and M0 in the direction of the R axis. When the storage position is further moved by one row in the direction of the B axis, the movement of the storage position in the direction of the R axis is started at M2. By this rule, in a 9×3 area 902, the simultaneously read out three lattice points can be taken out from the different memories M0 to M2. The remaining area of FIG. 3(B) can be filled by repetitions of the area 902. FIG. 3(C), which is an X-Y plane view of FIG. 3(A), shows the manner of assignment to the memories on the planes of GH=1, 3, 5 and 7 where GH is an odd number. The assignment manner is completely the same as that of FIG. 3(B) except that M0, M1 and M2 are replaced by M3, M4 and M5, respectively. As shown in FIGS. 3(B) and 3(C), by storing the output values at the lattice points into the memories M0 to M5, the data of the six lattice points simultaneously read out in one interpolation calculation can be taken out from different memories.

The host interface 121 is provided for writing the color conversion output values disposed on the color conversion table memory 114 in this manner. The color conversion table memory address generator 110 is provided for generating memory addresses for reading out the output values in response to the input color signal. The address generator 110 generates an address for accessing the color conversion table memory 114 from the higher-order bits of the input color signal, and outputs the address to the color conversion table memory 114 through the memory interface 112.

Next, how the color conversion table addresses are assigned to the lattice points, that is, the relationship between the lattice points and the color conversion table addresses will be described with reference to FIGS. 3(A), 3(B), 3(C) and 3(D). FIG. 3(B) is a view of assistance in explaining how the addresses are assigned to the disposed memories M0 to M2. The rule is such that groups each consisting of three memories are formed in the direction of the R axis with the B axis as the starting point and the groups are numbered from the origin in the direction of the R axis. The groups each consisting of three memories M0, M1 and M2 will hereinafter be referred to as unit blocks. After the assignment of the addresses in the direction of the R axis is finished, the assignment position is moved by one row in the direction of the B axis. In this embodiment, since the R, G and B axes are each divided into eight equal parts, there are 27 (=9×9÷3) unit blocks on one RB plane. Therefore, No. 26 is assigned to the unit block being farthest from the origin. Here, since the numbering is finished for the lowermost plane (GH=0) of M0 to M2, the assignment position is moved by one row in the direction of the G axis. At this time, skipping the M3 to M5 plane (GH=1) immediately above the M0 to M2 plane, the assignment position is moved to the M0 to M2 plane (GH=2) situated above the M3 to M5 plane. The number is 27 which is continued from 26. When the unit blocks are numbered in this manner, the number of the last unit block 903 situated at the opposite angle to the origin as shown in FIG. 3(A) is 134 (=26+27×4). The unit block numbers added as described above are used as the addresses of M0 to M2 as they are. The address assignment to M3 to M5 is completely the same. The numbering starts at the RB plane of GH=1 of FIG. 3(C). When the unit blocks are numbered in the same manner as that of M0 to M2, the number of a unit block 904 being farthest from the origin on the M3 to M5 plane is 107 (=26+27×3) as shown in FIG. 3(A). The numbers disagree with those on the M0 to M2 plane because the number of M0 to M2 planes is five and the number of M3 to M5 planes is four as is apparent from FIG. 3(D) showing an X-Z plane of FIG. 3(A).

As into which memories the output values at the lattice points are stored, and the addresses of the memories have been decided in the above-described manner, a manner in which the addresses are generated from (RH, GH, BH) of the color signal 102 of the higher-order bits and the determination signal PRISM of the output 107.

It is necessary for the address generator 110 to determine at which addresses in the six memories M0 to M5 the six lattice points to be selected in accordance with input pixel signals are stored as described with reference to FIGS. 3(A) to 3(D) to generate the address from (RH, GH, BH) of the color signal 102 and the determination signal PRISM of the output 107. The generation of the addresses means the calculation of the unit block numbers defined in FIGS. 4(A) and 4(B) as described above.

Therefore, first, it will be described how the numbers of the unit blocks including the lattice points are calculated from (RH, GH, BH) of the color signal 102 and the determination signal PRISM of the output 107. Since (RH, GH, BH) of the color signal 102 represents the position of an interpolation origin a, the number of the unit block including the lattice point corresponding to the interpolation origin a can be obtained by the unit block number of the interpolation origin a=GH×27+BH×3+RH/3. Here, RH/3 represents the quotient of a division by 3.

Then, at which of the three lattice points within the unit block including the interpolation origin a the origin is present is obtained from the remainders RHMOD3 and BHMOD3 of divisions of RH and BH by 3. The address relationship of other memories from which reading out is performed simultaneously with reading out from a memory to which the interpolation origin a is supplied will be described with reference to FIGS. 4(A) and 4(B). FIGS. 4(A) and 4(B) showing a part of FIG. 3(B) shows an example in which the interpolation origin a is present on the plane of GH=0. To each of FIGS. 4(A) and 4(B), triangular prism bottom surfaces in nine cases are added. The combinations of M0, M1 and M2 are summarized in the following eighteen: When PRISM=1, TYPE00, TYPE01, TYPE02,
TYPE03, TYPE04, TYPE05,
TYPE06, TYPE07, and TYPE08.
When PRISM=1,
TYPE10, TYPE11, TYPE12,
TYPE13, TYPE14, TYPE15,
TYPE16, TYPE17, and TYPE 18.

FIG. 4(A) shows the positions at the input color space lattice points of the bottom surfaces of the applicable triangular prisms when PRISM=0. The memories from which reading out is performed simultaneously with reading out from the origin memory are the ones at the vertices of the bottom surface figures of the triangular prisms. The interpolation origin a is the point at the lower left of the triangular bottom surfaces. When no applicable selected memory is present in the same unit block except for the interpolation origin a, the memory address is moved by one row in the X direction or the Y direction, or in the X direction and the Y direction. In this case, a movement by one row in the Y direction results in a movement of the address by three. FIG. 4(B) shows a case where PRISM=1. The address is moved in a similar manner to that of FIG. 4(A).

TABLE 3 shows RHMOD3, BHMOD3, PRISM, an address increase XINC the X direction and an address increase YINC in the Y direction for each TYPE.

TABLE 3

| Type-A | MOD3 | | | XINC | | | YINC | | |
|---|---|---|---|---|---|---|---|---|---|
| | | | | M0 | M1 | M2 | M0 | M1 | M2 |
| Type-B | RH | BH | PRISM | (M3) | (M4) | (M5) | (M3) | (M4) | (M5) |
| 00 | 0 | 0 | 0 | 0 | 0 | 0 | 0 | 0 | 1 |
| 01 | 1 | 0 | 0 | 0 | 0 | 0 | 1 | 0 | 0 |
| 02 | 2 | 0 | 0 | 1 | 1 | 0 | 0 | 1 | 0 |
| 03 | 0 | 1 | 0 | 0 | 0 | 0 | 1 | 0 | 0 |
| 04 | 1 | 1 | 0 | 0 | 0 | 0 | 0 | 1 | 0 |
| 05 | 2 | 1 | 0 | 0 | 1 | 1 | 0 | 0 | 1 |
| 06 | 0 | 2 | 0 | 0 | 0 | 0 | 0 | 1 | 0 |
| 07 | 1 | 2 | 0 | 0 | 0 | 0 | 0 | 0 | 1 |
| 08 | 2 | 2 | 0 | 1 | 0 | 1 | 1 | 0 | 0 |
| 10 | 0 | 0 | 1 | 0 | 0 | 0 | 0 | 1 | 1 |
| 11 | 1 | 0 | 1 | 0 | 0 | 0 | 1 | 0 | 1 |
| 12 | 2 | 0 | 1 | 0 | 1 | 0 | 1 | 1 | 0 |
| 13 | 0 | 1 | 1 | 0 | 0 | 0 | 1 | 0 | 1 |
| 14 | 1 | 1 | 1 | 0 | 0 | 0 | 1 | 1 | 0 |
| 15 | 2 | 1 | 1 | 0 | 0 | 1 | 0 | 1 | 1 |
| 16 | 0 | 2 | 1 | 0 | 0 | 0 | 1 | 1 | 0 |
| 17 | 1 | 2 | 1 | 0 | 0 | 0 | 0 | 1 | 1 |
| 18 | 2 | 2 | 1 | 1 | 0 | 0 | 1 | 0 | 1 |

The interpolation origin a and TYPEs are determined in this manner. When GH=2, 4, and 6, address calculation is performed in a similar manner. When GH=1, 3, 5 and 7, address calculation can be performed by replacing M0, M1 and M2 with M3, M4 and M5, respectively. TABLE 4 shows the correspondence between the memories M0 to M5 and lattice point data (a) and (b) or (d), (c), (e) and (f), or (h) and (g) for each TYPE. The signal STYPE 122 can be classified in six types.

TABLE 4

| Type-A | | SEL | SELECTOR-A | | | SELECTOR-B | | |
|---|---|---|---|---|---|---|---|---|
| GH | type-B | Type | a | b/d | c | e | f/h | f |
| 0 | X0,X5,X7 | 0 | M0 | M1 | M2 | M3 | M4 | M5 |
| 2 | X1,X3,X8 | 1 | M1 | M2 | M0 | M4 | M5 | M3 |
| 4 | X2,X4,X6 | 2 | M2 | M0 | M1 | M5 | M3 | M4 |
| 6 | | | | | | | | |
| 1 | X0,X5,X7 | 3 | M3 | M4 | M5 | M0 | M1 | M2 |
| 3 | X1,X3,X8 | 4 | M4 | M5 | M3 | M1 | M2 | M0 |
| 5 | X2,X4,X6 | 5 | M5 | M3 | M4 | M2 | M0 | M1 |
| 7 | | | | | | | | |

The address output 111 generated in this manner is supplied to the color conversion table memory 114 as the output 113 by way of the memory interface 112. The color conversion table memory 114 is divided into the six memories M0 to M5 to and from each of which the address is supplied and the table data output 115 is read out. The output 115 is supplied to the table data selector 116, selected as the lattice point data (a) and (b) or (d), (c), (e) and (f) or (h) and (g) by the STYPE signal 122, and supplied to the triangular prism and tetrahedron interpolation calculator 118 as the lattice point data.

FIG. 5 is an internal block diagram of the triangular prism and tetrahedron interpolation calculator 118. The calculations of both the triangular prisms and the tetrahedrons can be performed by this calculator by performing switching by the signal PNTSEL. Five multipliers MUL1, MUL2, MUL3, MUL4 and MUL5 are provided. Interpolation vector calculation is performed by efficiently using these multipliers irrespective of different lattice points. The inputs, that is, the multiplicands and the multipliers of MUL1 to MUL5 are shown in TABLE 5 for each case of the triangular prisms and the tetrahedrons, that is, for each of PRISMs and TETRAs.

TABLE 5

| PNTSEL | PRISM | TETRA | Determination expression | MUL1 601 | W1 | MUL2 602 | W2 | MUL3 603 | W3 | MUL4 604 | W4 | MUL5 Multiplicand 605 | W5: Multiplier |
|---|---|---|---|---|---|---|---|---|---|---|---|---|---|
| 0 Tetrahedron | 0 | 00 | $R_L > B_L > G_L$ | (a) | 1-RL | (b) | RL-BL | (c) | BL-GL | (g) | GL | 605 | 1 |
| | 0 | 01 | $R_L > G_L > B_L$ | (a) | 1-RL | (b) | RL-GL | (f) | GL-BL | (g) | BL | 605 | 1 |
| | 0 | 02 | $G_L > R_L > B_L$ | (a) | 1-GL | (e) | GL-RL | (f) | RL-BL | (g) | BL | 605 | 1 |
| | 1 | 10 | $B_L > R_L > G_L$ | (a) | 1-BL | (d) | BL-RL | (c) | RL-GL | (g) | GL | 605 | 1 |
| | 1 | 11 | $B_L > G_L > R_L$ | (a) | 1-BL | (d) | BL-GL | (h) | GL-RL | (g) | RL | 605 | 1 |
| | 1 | 12 | $G_L > B_L > R_L$ | (a) | 1-GL | (e) | GL-BL | (h) | BL-RL | (g) | RL | 605 | 1 |
| 1 Triangular prism | 0 | — | $R_L > B_L$ | (b) − (a) | RL | (c) − (b) | BL | (f) − (e) | RL | (g) − (f) | BL | 605 | GL |
| | 1 | — | $B_L > R_L$ | (d) − (a) | BL | (c) − (d) | RL | (h) − (e) | BL | (g) − (h) | RL | 605 | GL |

Weight coefficients W1 to W5 of the selected weight coefficient 108 are selected and supplied by the triangular prism and tetrahedron area determiner 106 for each PRISM and TETRA. Reference numerals 601, 602, 603 and 604 represent the multiplicands of the multipliers MUL1, MUL2, MUL3 and MUL4. The multiplicands 601, 602, 603 and 604 are selected based on the lattice point data 117 as shown in TABLE 5. Reference numerals AD1 to AD6 represent adders. Reference numerals DI1 to DI5 represent subtracters. Reference numerals 611 to 614 represent selectors being selected based on the PRISM or the TETRA in accordance with TABLE 5. Reference numeral 605 represents the multiplicand of the multiplier MUL 5. Reference numeral 606 represents an interpolation calculation output. The triangular prism interpolation calculation is performed by the following expression 2:

$$606 = (a) + (601 \times W1 + 602 \times W2) + W5 \times [\{(e)-(a)\} + \{(603 \times W3 + 604 \times W4) + (601 \times W1 + 602 \times W2)\}]$$ (Expression 2)

The tetrahedron interpolation calculation is performed by the following expression 3:

$$606 = 601 \times W1 + 602 \times W2 + 603 \times W3 + 604 \times W4$$ (Expression 3)

At this time, in the calculator of FIG. 5, the selectors 607, 608 and 609 select 0 when the PNTSEL signal is 0, that is, when the tetrahedron interpolation calculation is performed, and select an input A when the triangular prism interpolation calculation is performed, that is, when the signal PNTSEL is 0.

In this manner, the interpolation calculations of triangular prisms and tetrahedrons having different numbers of vertices can be performed with the same color conversion table by efficiently using the calculator.

Thus, by providing the signal line PNTSL 130 in the solid area determiner 106 and the solid interpolation calculator 118 and by switching the output of the color conversion table memory 114 and the calculation used for a given solid interpolation and an interpolation of solids obtained by dividing a solid, in performing a color conversion, the efficient color conversion table memory is efficiently used and a given color conversion is performed over the entire color space by use of the output values at a plurality of vertices of a unit interpolation solid with continuity being ensured, thereby eliminating the necessity for a color conversion table other than the color conversion table for the input color space.

For octahedrons and triangular prisms or for octahedrons and tetrahedrons having different numbers of vertices, the interpolation calculation can be performed with the same color conversion table in a similar manner by effectively using the calculator. In this case, the color conversion table is formed in accordance with the solid having a larger number of vertices.

What is claimed is:

1. A color conversion apparatus comprising:
an image input portion for separating a color image signal expressed by various color signals into a higher-order bit part and a lower-order bit part;
a weight generator for generating, by use of the lower-order bit part, interpolation weight coefficients corresponding to a given solid and a divisional solid obtained by dividing the given solid;
a determiner for choosing between the given solid and the divisional solid based on magnitudes of the interpolation weight coefficients;
an address generator for generating a color conversion table memory address to be accessed, based on the higher-order bit part and an output of the determiner;
a color conversion table memory in which output values at lattice points of an input color signal are stored and divided into a predetermined number of groups;
a selector for, from the lattice point outputs stored in the color conversion table memory, selecting a plurality of lattice point outputs when an interpolation method of the given solid is used, and selecting an applicable lattice point output from a plurality of lattice points when an interpolation method of the divisional solid is used; and
an interpolation calculator for interpolating the output value read out from the color conversion table memory by use of the interpolation weight coefficient,
wherein the following switchings are performed with a common control signal: whether the selector outputs vertex data of the given solid or vertex data of the divisional solid; whether the weight generator outputs the interpolation weight coefficient corresponding to the given solid or the interpolation weight coefficient corresponding to the divisional solid; and whether the interpolation calculator performs an interpolation of the given solid or an interpolation of the divisional solid.

2. A color conversion apparatus comprising:
an image input portion for separating a color image signal expressed by various color signals into a higher-order bit part and a lower-order bit part;
a weight generator for generating interpolation weight coefficients corresponding to a triangular prism and a tetrahedron by use of the lower-order bit part;
a determiner for choosing between the triangular prism and the tetrahedron based on magnitudes of the interpolation weight coefficients;
an address generator for generating a color conversion table memory address to be accessed, based on the higher-order bit part and an output of the determiner;
a color conversion table memory in which output values at lattice points of an input color signal are stored and divided into six groups;
a selector for, from the lattice point outputs of the color conversion table memory, selecting six points when a triangular prism interpolation method is used and selecting four points of the six points when a tetrahedron interpolation method is used; and
an interpolation calculator for interpolating the output value read out from the color conversion table memory by use of the interpolation weight coefficient,
wherein the following switchings are made with a common control signal: whether the selector outputs vertex data of the tetrahedron or vertex data of the triangular prism; whether the weight generator outputs the interpolation weight coefficient corresponding to the tetrahedron or the interpolation weight coefficient corresponding to the triangular prism; and whether the interpolation calculator performs a triangular prism interpolation or a tetrahedron interpolation.

3. A color conversion apparatus comprising:
an image input section that separates a color image signal expressed by various color signals into a higher-order bit part and a lower-order bit part;
a weight generator that generates, by use of the lower-order bit part, interpolation weight coefficients corresponding to a given solid and to a divisional solid, obtained by dividing the given solid;
a determiner that chooses between the given solid and the divisional solid based on magnitudes of the interpolation weight coefficients;

an address generator that generates a color conversion table memory address to be accessed, based on the higher-order bit part and an output of the determiner;

a color conversion table memory that stores output values corresponding to lattice points of an input color signal and arranges the stored output values into a predetermined number of groups;

a selector that selects a plurality of the stored output values, from the predetermined number of groups, in accordance with the generated memory address and an interpolation method of the given solid and selects an applicable stored output value from the plurality of stored output values in accordance with the generated memory address and an interpolation method of the divisional solid; and an interpolation calculator that interpolates the stored output values read out from the color conversion table memory using the interpolation weight coefficients, wherein:

the following operations are performed in accordance with a common control signal: the selector outputs vertex data of the given solid or vertex data of the divisional solid; the weight generator outputs the interpolation weight coefficients corresponding to the given solid or the interpolation weight coefficients corresponding to the divisional solid; and the interpolation calculator interpolates the stored output values for the given solid or the divisional solid.

4. A color conversion apparatus comprising:

an image input section that separates a color image signal expressed by various color signals into a higher-order bit part and a lower-order bit part;

a weight generator that generates interpolation weight coefficients corresponding to a triangular prism and a tetrahedron by use of the lower-order bit part;

a determiner that chooses between the triangular prism and the tetrahedron based on magnitudes of the interpolation weight coefficients;

an address generator that generates a color conversion table memory address to be accessed, based on the higher-order bit part and an output of the determiner;

a color conversion table memory that stores output values corresponding to lattice points of an input color signal and divides the stored output values into six groups;

a selector that selects six points, from the six groups, in accordance with the generated memory address and a triangular prism interpolation method and selects four points of the six points in accordance with a tetrahedron interpolation method; and an interpolation calculator that interpolates the stored output values read out from the color conversion table memory using the interpolation weight coefficients, wherein:

the following switching operations are made in accordance with a common control signal: the selector outputs vertex data of the tetrahedron or vertex data of the triangular prism; the weight generator outputs the interpolation weight coefficients corresponding to the tetrahedron or the interpolation weight coefficients corresponding to the triangular prism; and the interpolation calculator performs the triangular prism interpolation or the tetrahedron interpolation.

* * * * *